US012710567B2

(12) United States Patent
Castro Martinez

(10) Patent No.: US 12,710,567 B2
(45) Date of Patent: Aug. 18, 2026

(54) SEMI-FINISHED LENS, METHOD AND DEVICE FOR MANUFACTURING AN OPTICAL LENS

(71) Applicant: Essilor International, Charenton-le-Pont (FR)

(72) Inventor: Luis Castro Martinez, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1095 days.

(21) Appl. No.: 17/280,788

(22) PCT Filed: Sep. 27, 2019

(86) PCT No.: PCT/EP2019/076275
§ 371 (c)(1),
(2) Date: Mar. 26, 2021

(87) PCT Pub. No.: WO2020/065049
PCT Pub. Date: Apr. 2, 2020

(65) Prior Publication Data

US 2022/0003898 A1 Jan. 6, 2022

(30) Foreign Application Priority Data

Sep. 28, 2018 (EP) .................................... 18306285

(51) Int. Cl.
*G02B 3/00* (2006.01)
*B24B 13/00* (2006.01)

(52) U.S. Cl.
CPC ................ *G02B 3/00* (2013.01); *B24B 13/00* (2013.01)

(58) Field of Classification Search
CPC .. G03B 3/0012; G03B 3/0025; G03B 3/0031; B24B 13/00; B24B 13/0037; B24B 13/0052; B24B 13/0055
(Continued)

(56) References Cited

U.S. PATENT DOCUMENTS 6,014,264 A 1/2000 Sommargren
2015/0309217 A1* 10/2015 Castro ................ B24B 13/0055 29/458

(Continued)

FOREIGN PATENT DOCUMENTS

WO 2011/140043 11/2011
WO 2014/131878 9/2014
WO 2014/131879 9/2014

OTHER PUBLICATIONS

International Search Report for PCT/EP2019/076275 dated Nov. 4, 2019, 4 pages.

(Continued)

*Primary Examiner* — Marin Pichler
(74) *Attorney, Agent, or Firm* — NIXON & VANDERHYE

(57) ABSTRACT

Disclosed is a semi-finished lens including a first optical surface including a surface design associated with a first reference system and a second optical surface to be manufactured, the first and second optical surfaces are connected by an external periphery surface, the semi-finished lens further including a reference element provided on the second optical surface and/or on the external periphery surface, the position of the reference element being defined with respect to the first reference system. Also disclosed is a method and a device for manufacturing an optical lens from such a semi-finished lens.

9 Claims, 3 Drawing Sheets

(58) Field of Classification Search
USPC ........................ 359/642; 351/159.73, 159.75
See application file for complete search history.

(56) References Cited

U.S. PATENT DOCUMENTS

| | | | | |
|---|---|---|---|---|
| 2016/0001414 | A1* | 1/2016 | Dubois | ............... B24B 13/0055<br>351/159.8 |
| 2016/0011434 | A1* | 1/2016 | Dubois | .................... G02C 7/02<br>351/159.8 |
| 2021/0220958 | A1* | 7/2021 | Beier | ............... B29D 11/00961 |

OTHER PUBLICATIONS

Written Opinion of the ISA for PCT/EP2019/076275 dated Nov. 4, 2019, 8 pages.

* cited by examiner

SEMI-FINISHED LENS, METHOD AND DEVICE FOR MANUFACTURING AN OPTICAL LENS

CROSS-REFERENCE TO RELATED APPLICATIONS

This application is the U.S. national phase of International Application No. PCT/EP2019/076275 filed Sep. 27, 2019 which designated the U.S. and claims priority to EP 18306285.0 filed Sep. 28, 2018, the entire contents of each of which are hereby incorporated by reference.

FIELD OF THE INVENTION

The present invention relates to a method for manufacturing an optical lens from a semi-finished lens and to a corresponding machining device. The invention further relates to a semi-finished lens.

BACKGROUND OF THE INVENTION

An optical lens is typically made of plastic or glass material and generally has two opposing surfaces which co-operate to provide a required refractive property. The optical lens may be, for example, but not limited to an ophthalmic lens. When the positioning or shape of one of these surfaces with respect to the other is inaccurate, optical errors can occur.

Manufacturing of an optical lens to the required refractive property typically includes machining a face of a semi-finished lens. Typically, a semi-finished lens has a finished face, for example the front face and an unfinished face, for example the back face. By machining the back face of the lens to remove material, the required shape and positioning of the surface of the back face with respect to the surface of the front face for the desired corrective prescription can be generated. Further surfacing operations of an optical lens can include chamfering, beveling, polishing, or coating the surface of a lens member in order to modify the optical surface.

During manufacturing of the lens it is important that the semi-finished lens is securely maintained in an accurate position on a blocker during the various manufacturing operations in order to prevent the generation of optical errors. As well-known fusible metals or polymerizable resins are generally employed to secure the semi-finished lens and the blocker.

Conventionally, a semi-finished lens is provided with engraved markings on the finished face. The engraved markings define a reference system of the surface of the finished face of the semi-finished lens.

For some optical designs, for example when both surfaces have asymmetrical designs, controlling accurately the relative position of the optical surfaces is very important so as to guarantee the desired optical functions.

The relative position of the back and front surfaces is thus guaranteed by the engraved markings on the finished surface during the blocking. Sometimes the manufacturing process also comprises an intermediate step of ink marking using the engraved markings since the engraved markings are not visible enough in the blocking device.

Nevertheless, during the manufacturing, and more particularly between the blocking and the machining, the blocking may become unregulated and consequently lead to an error in the relative position of the surfaces. Indeed, since the relative position of the optical surfaces is given during the blocking, the current method for manufacturing the optical lens does not take into account the problems of adjustment of the blocker, wear of the reference components of the blocker, the clearance between the housing of the blocker and the insert, wear of the inserts, off-set between the housing of the clamps and the clamps of the machining machines and the wear of the clamps and reference bars of the clamps of the machining machines.

A goal of the present invention is to provide an alternative to classical method for manufacturing an optical lens that allows increase accuracy in the positioning of both surfaces of the final optical lens.

SUMMARY OF THE INVENTION

To this end, the invention proposes a semi-finished lens comprising a first optical surface comprising a surface design associated with a first reference system and a second optical surface to be manufactured, the first and second optical surfaces are connected by an external periphery surface, the semi-finished lens further comprising a reference element provided on the second optical surface and/or on the external periphery surface, the position of the reference element being defined with respect to the first reference system.

Advantageously, such having reference element provided on the second optical surface and/or on the external periphery surface and defined with respect to the first reference system increases the accuracy of the relative positioning of the second optical surface with respect to the first optical surface during the manufacturing. Indeed, the use of such a semi-finished thus allows to shift the relative positioning step of the two surfaces of the blocking step to the machining step in order to improve the quality of the optical function of the finished lens. Thus, the blocking step is simplified compared to the usual blocking steps facilitating a possible change of blocking technology (fusible metal, polymerizable resin, vacuum, glue, tape . . . ).

Therefore, one may position more easily and accurately the surfaces during the manufacturing method.

According to further embodiments which can be considered alone or in combination:

- the reference element is provided at least partly on the second optical surface to be manufactured;
- the reference element comprises markings realized by engraving during molding of at least the surface of the semi-finished lens on which the reference element is provided;
- the markings are realized by engraving mechanically traversing the semi-finished lens from the first optical surface to the second optical surface;
- the markings are configured to be optically detectable and/or mechanically detectable;
- the reference element comprises at least a sub-surface element located between the first and second optical surfaces at a distance from the second optical surface less than 10 mm;
- the sub-surface element comprises a plurality of sub-surface markings, the sub-surface markings defining a plan;
- the first reference system is identified by first markings on the first optical surface.

The invention further relates to a method for manufacturing an optical lens, the method comprising:

- providing a semi-finished lens according to any of the preceding claims;

providing surface data corresponding to the second optical surface of the optical lens to be manufactured;

positioning fixedly the first optical surface of the semi-finished lens in a machining device in a blocking position with respect to a machining reference system of the machining device;

determining the position of the reference element of the semi-finished lens in the machining reference system while the first optical surface is in the blocking position;

determining the position of the first optical surface in the machining reference system using the determined position of the reference element in the machining reference system;

manufacturing the second optical surface according to the surface data so that the second surface is positioned with respect to the determined position of the first optical surface in the machining reference system.

According to further embodiments of the method which can be considered alone or in combination:

the method further comprises providing the position of the second optical surface to be manufactured relative to the first optical surface in the first reference system;

the method further comprises determining the position of the reference element relative to the first optical surface;

surface data depends on the surface design of the first optical surface and the prescription of a wearer for which the optical lens is manufactured.

Another object of the invention relates to a machining device for manufacturing an optical lens, the machining device having a machining reference system and comprising:

a blocking system configured to position fixedly the first optical surface of a semi-finished lens in a machining device in a blocking position with respect to the machining reference system; the semi-finished lens being a semi-finished lens according to the invention;

a position tool configured to determine the position of the reference element of the semi-finished lens in the machining reference system while the first optical surface is in the blocking position;

a processor for determining the position of the first optical surface in the machining reference system using the determined position of the reference element in the machining reference system;

a machining tool configured to manufacture by machining the second optical surface according to surface data corresponding to the second optical surface of the optical lens to be manufactured so that the second surface is positioned with respect to the determined position of the first optical surface in the machining reference system.

According to further embodiments of the machining device which can be considered alone or in combination:

the blocking tool comprises a clamp arranged to clamp the semi-finished lens in the blocking position, the clamp defining the machining reference system;

the position tool comprises a digital camera configured to acquire images of the reference element through the semi-finished lens in the blocking position, and wherein the processor is further configured for determining the position of the reference element in the machining reference system using the images acquired by the camera while the first optical surface is in the blocking position;

the position tool comprises a probe for determining the position of the reference element of the semi-finished lens in the machining reference system while the first optical surface is in the blocking position.

According to a further aspect, the invention further relates to a device comprising a processor adapted to store one or more sequence of instructions and to carry out at least one of the steps of the method according to the invention.

More particularly, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION

Figure 1:
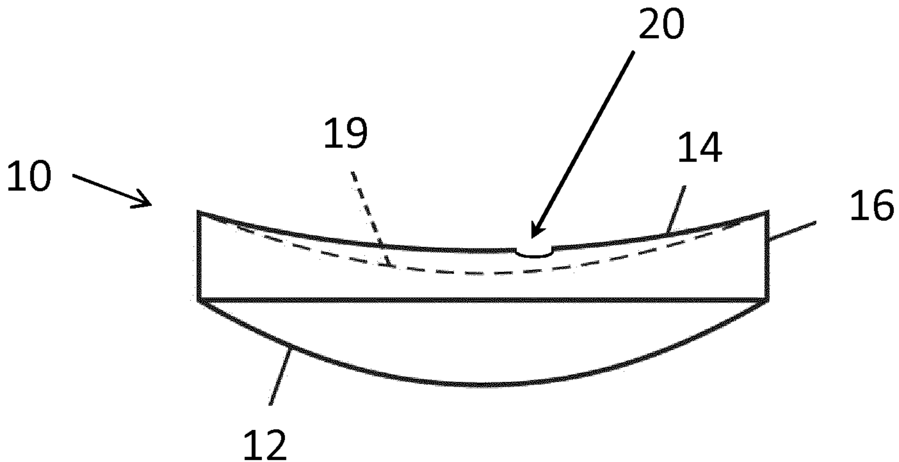
FIG. 1 is a side view of a semi-finished lens to be manufactured.

With reference to FIG. 1, a first aspect of the invention relates to a semi-finished lens 10 comprising a first optical face having a first optical surface 12 and a second optical face having a second optical surface 14 to be manufactured. The first and second optical surfaces are connected by an external periphery surface 16.

Such semi-finished lens can be manufactured from a piece of transparent material, for example plastic, by molding or by surfacing in order to form the first optical surface.

The first optical surface 12 comprises a surface design associated with a first reference system.

In the sense of the invention, a "surface design" is a widely used wording known from the man skilled in the art to designate the set of parameters allowing defining the surface of a face of an optical lens member, i.e. the first optical surface 12 of the semi-finished lens 10 according to the invention. For example the surface design may comprise the surface equation, position and orientation of the first optical surface 12 of the semi-finished lens 10, such equation, position and orientation being defined in the first reference system according to the invention.

For example, such reference system can be identified by at least one first referencing element, for example first markings on the first optical surface. In the sense of the invention, the wording "reference system identified by at least one first referencing element" is to be understood as meaning that a skilled person can easily identify the main center and the mains axis of the reference system from the position and orientation of the first referencing element.

Figure 2:
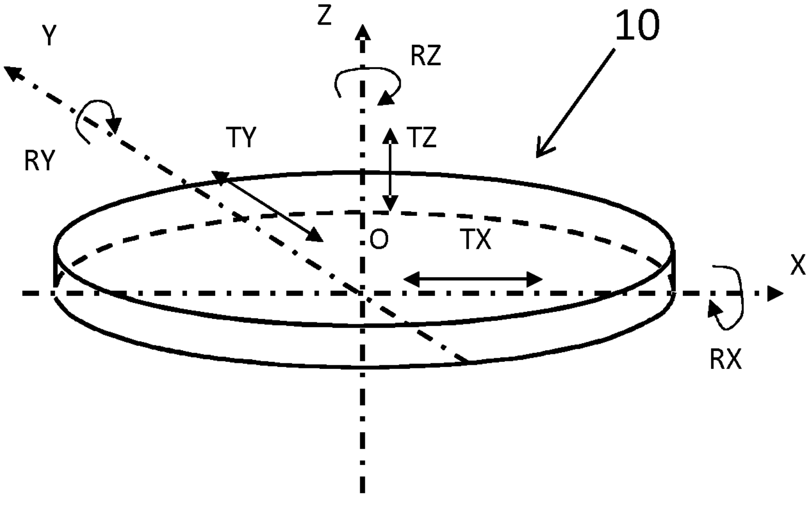
FIG. 2 is a perspective view of a preformed surface of a semi-finished lens illustrating a reference system and the position parameters.

As represented on FIG. 2, the first reference system comprises a main axis Z perpendicular to a main plane (X, Y) defined by two axes X, Y perpendicular to each other and to the main axis Z. The position of the semi-finished lens, in particular of each optical surface of the semi-finished lens in such reference system is defined by six parameters. Among the six parameters, three are translation parameters TX, TY and TZ along each axis X, Y, and Z and three are rotation parameters RX, RY, and RZ about each of the axis X, Y, and Z.

The first optical surface 12 of the finished face of the semi-finished lens can be usually obtained by molding, machining or any other conventional known means.

In the example represented on FIG. 1, the first optical face corresponds to the front face of the semi-finished lens 10. In use of the resulting finished optical lens, the front face is disposed nearest the object being viewed.

The second surface 14 is to be modified by a manufacturing method so as to provide for example the back face of the finished optical lens, represented by the dotted line 19.

While in this embodiment of the invention, the first face is the front face of the finished optical lens and the second face is the back face, it will be understood, that in alternative embodiments of the invention the first face may be the back face of the finished optical lens and the second face may be the front face.

Moreover, although the face to be manufactured is represented in FIG. 1 as concave, it will be appreciated that this surface 14 could equally well be convex or any other curved surface.

According to the invention, the semi-finished lens 10 further comprises at least a reference element 20 provided on the second optical surface 14 and/or on the external periphery surface 16. The position of the reference element 20 is defined with respect to the first reference system.

In a preferred embodiment, the reference element 20 is provided at least partly on the second optical surface to be manufactured.

In the embodiment illustrated on FIG. 1 illustrates an embodiment wherein the reference element 20 is provided only on the second optical surface 14.

Advantageously, the reference element 20 comprises markings realized by engraving during molding of at least the surface of the semi-finished lens on which the reference element is provided, i.e. on the second optical surface in the embodiment illustrated on FIG. 1.

The reference element 20 is realized on the second surface, i.e. the back surface in this detailed embodiment, of the semi-finished lens during its molding by injection or by casting. Such reference element 20 on the second and back surface of the semi-finished lens is configured to allow to completely define the position of the back face with respect to the position of the first and front face, which is defined by the markings also realized during the molding of the semi-finished lens. In the case where the first surface is done by surfacing, the surfacing reference can be used to make the engravings for the first and second surfaces.

For example, the markings are realized by engraving mechanically traversing the semi-finished lens from the first optical surface to the second optical surface.

Advantageously, the markings are configured to be optically detectable and/or mechanically detectable. Thus, the method can also comprise an intermediate step during which the markings are made optically and/or mechanically detectable. For example, the markings can be inked to make them optically detectable.

According to an embodiment, the reference element 20 can advantageously comprise at least a sub-surface element located between the first and second optical surfaces at a distance from the second optical surface allowing an optically marking detection, for example at a distance from the second optical surface less than 10 mm.

According to an example, the sub-surface element comprises a plurality of sub-surface markings, the sub-surface markings defining a plan P.

The reference element 20 is configured to remain at least partially in the manufactured optical lens after the second optical face has been manufactured and eventually after the optical lens has been edged so as to fit a spectacle frame. Therefore, preferably the reference element 20 is configured so as not to cause any discomfort to the wearer of the optical lens. For example, the reference element 20 is placed out of the wearer's principal visual field.

Alternatively, the reference element 20 is configured to vanish from the manufactured optical lens after the second optical face has been manufactured and eventually after the optical lens has been edged so as to fit a spectacle frame. In this embodiment the visibility of the reference element 20 can be much higher than in the previously described embodiment.

Figures 3, 4:
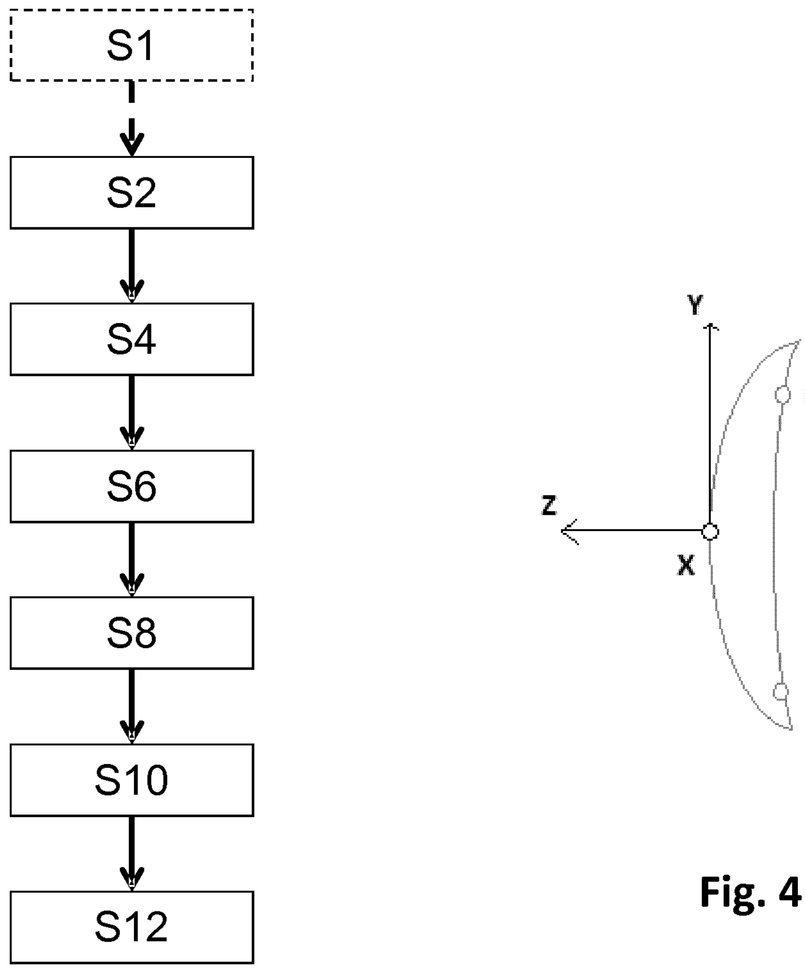
FIG. 3 is a flowchart of the steps of an embodiment of the method of manufacturing an optical lens according to the invention.
FIG. 4 is a side view of an example of a semi-finished lens to be manufactured according to the invention.

As represented on FIG. 3, the invention further relates to a method for manufacturing an optical lens.

The method comprises at least:

a semi-finished lens providing step S2;

a surface data providing step S4;

a first optical surface positioning step S6;

a reference element position determining step S8;

a first optical surface position determining step S10; and a second optical surface manufacturing step S12.

During the step S2, a semi-finished lens 10 according to the invention and as previously described is provided. More particularly, the position of the reference element(s) 20 is(are) provided with respect to the first reference system associated with the first optical surface 12.

For example, the method can further comprise a preliminary step S1 for determining the position of the reference element 20 relative to the first optical surface 12.

Then, surface data corresponding to the second optical surface 14 of the optical lens to be manufactured are provided during the step S4.

Surface data preferably depends on the surface design of the first optical surface 12 and the prescription of a wearer for which the optical lens is manufactured.

During the step S6, the first optical surface 12 of the semi-finished lens is positioned fixedly in a machining device in a blocking position with respect to a machining reference system of the machining device.

The position of the reference element 20 of the semi-finished lens is determined in the machining reference system while the first optical surface 12 is in the blocking position during the step S8.

For example, when the semi-finished lens 10 is positioned in the machining device, the tridimensional coordinates of the reference element 20 of the second optical surface 14 to be machined can be determined by measurement using a mechanical probe embedded into the machining device in the machining reference system.

Then, during the step S10 the position of the first optical surface 12 in the machining reference system is determined using the determined position of the reference element in the machining reference system.

The second optical surface 14 is then manufactured according to the surface data so that the second optical surface is positioned with respect to the determined position of the first optical surface 12 in the machining reference system during the step S12.

According to an embodiment of the method, the method can further comprise a step for providing the position of the second optical surface 14 to be manufactured relative to the first optical surface 12 in the first reference system.

For example, FIG. 4 illustrates a semi-finished lens having a first and front surface comprising a surface design associated with a front reference system denoted $R_{Lens}(O, X, Y, Z)$, the front surface being blocked during the machining of the second and back surface.

This front reference system $R_{Lens}(O, X, Y, Z)$ is defined with respect to the geometry of the front surface of the semi-finished lens. For example, if the blocked and front surface is a progressive surface, one can define the origin of the front reference system O as the prism reference point (PRP), the Z axis as the normal to the surface at this point, the X axis as the horizontal axis traditionally given by the horizontality markings of a progressive surface.

Furthermore, the semi-finished lens has a second and back surface to be machined. The back surface comprises two mechanical reference elements whose positions in the front reference system are respectively denoted E1 ($X1_L$, $Y1_L$, $Z1_L$) and E2 ($X2_L$, $Y2_L$, $Z2_L$).

The machining reference system $R_M(O_M, X_M, Y_M, Z_M)$ of a machining device is for example defined by a clamping arm of the machining device configured to block the front (first) optical surface of the semi-finished lens in the blocking position.

Firstly, the position of the two mechanical reference elements E1, E2 of the back (second) optical surface are determined in the machining reference system $R_M$, for example by measurement using a mechanical probe embedded into the machining device. The coordinates of the two mechanical reference elements E1, E2 in the machining reference system are denoted respectively E1 ($X1_M$, $Y1_M$, $Z1_M$) and E2 ($X2_M$, $Y2_M$, $Z2_M$).

Secondly, the transformation allowing to pass from the machining reference system $R_M$ to the front reference system $R_{Lens}$ is determined according to the following equation:

$$M_{Lens} = T + R.\ M_M$$

wherein: T(Tx,Ty,Tz) is a translation vector, R is a 3×3 rotation matrix, $M_{Lens}$ is the coordinates of a point in the front reference system $R_{Lens}$ and $M_M$ is the coordinates of the same point in the machining reference system $R_M$.

Then, knowing the translation vector T and the rotation matrix R, it is therefore possible to determine the translation and/or rotation of the front (first) surface relative to the machining reference system, which directly gives the positioning defects.

Finally, the back (second) optical surface can be determined in the machining reference system according to the surface data and the determined position of the front (first) optical surface in the machining reference system and then manufactured so that the back (second) surface is positioned with respect to the front (first) optical surface.

Figure 5:
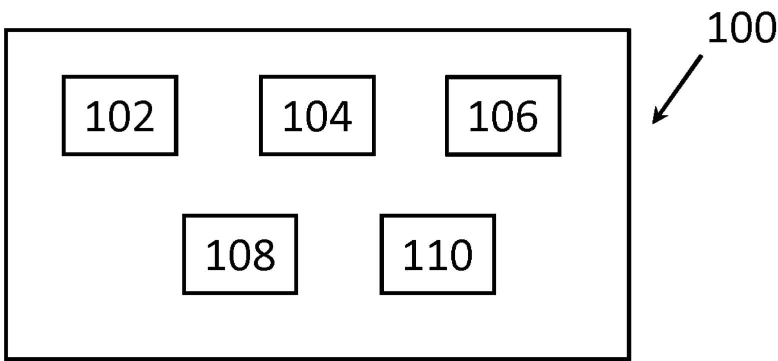
FIG. 5 is a schematic view of an embodiment of a machining device according to the invention.

FIG. 5 illustrates an embodiment of a machining device 100 for manufacturing an optical lens according to the invention, the machining device 100 having a machining reference system.

The machining device comprises a blocking system 102, a position tool 104 and a machining tool 106.

Figure 6:
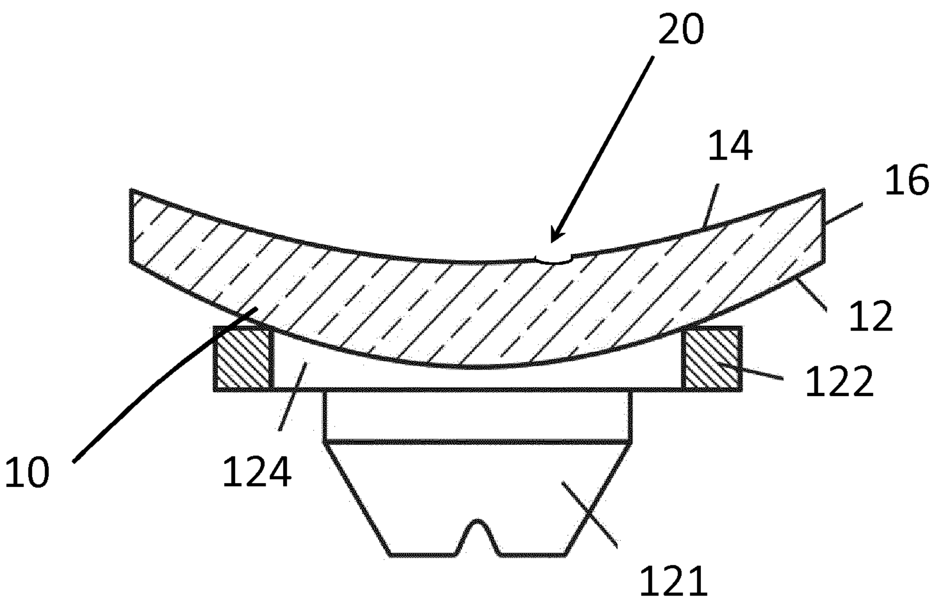
FIG. 6 is a cross-section view of a semi-finished lens to be manufactured having a first optical surface placed on a blocking ring of a blocking system.

The blocking system 102 is configured to position fixedly the first optical surface of a semi-finished lens as previously described in the machining device 100 in a blocking position with respect to the machining reference system. For example and with reference to FIG. 6, the blocking system 102 may comprise an insert 121 and a blocking ring 122. Blocking cast material 124 is poured into the cavity defined by the lower surface of the semi-finished lens 10, the insert 121 and the blocking ring 122. The blocking cast material 124 cools to solidify in order to provide a blocker for the semi-finished lens 10 at the desired positioning for machining.

Advantageously, the blocking system 102 comprises a clamp arranged to clamp the semi-finished lens in the blocking position, the clamp defining the machining reference system. The clamp is configured to be moved from a free position to a clamping position in which it holds the semi-finished lens 10 in place on the blocking system 102.

The position tool 104 is configured to determine the position of the reference element of the semi-finished lens in the machining reference system while the first optical surface is in the blocking position.

Advantageously, the machining device 100 is adapted to implement a method of manufacturing according to the invention and detailed hereinafter. To this end, the machining device 100 comprises a memory 108 and a processor 110.

The memory 108 is adapted to store one or more sequences of instructions that are accessible to the processor 110 and which, when executed by the processor, causes the processor to carry out steps of the method. More particularly, the processor carries out the determining the position of the first optical surface in the machining reference system using the determined position of the reference element in the machining reference system.

The machining tool 106 of the machining device is configured to manufacture by machining the second optical surface according to surface data corresponding to the second optical surface of the optical lens to be manufactured so that the second surface is positioned with respect to the determined position of the first optical surface in the machining reference system.

According to an embodiment of the machining device, the position tool 104 advantageously comprises a digital camera configured to acquire images of the reference element through the semi-finished lens in the blocking position.

In such embodiment, the processor 108 is further configured for determining the position of the reference element in the machining reference system using the images acquired by the camera while the first optical surface is in the blocking position.

According to another embodiment of the machining device compatible with the previous ones, the position tool 104 comprises a probe for determining by mechanical measurement the position of the reference element of the semi-finished lens in the machining reference system while the first optical surface is in the blocking position;

While the foregoing examples have been described with reference to the manufacture of an ophthalmic lens, it will be appreciated that the method of the invention may be applied more generally to the manufacture of other types of optical lens, for example optical lens used in telescopes and the like, car headlight, micro lenses solar panels.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for manufacturing an optical lens, the method comprising:

providing a semi-finished lens comprising a first optical surface comprising a surface design associated with a first reference system, a second optical surface to be manufactured, the first and second optical surfaces being connected by an external periphery surface, and a reference element provided on one or more of (i) the second optical surface, and (ii) the external periphery surface, the reference element being an engraving mark, a position of the reference element being defined with respect to the first reference system;

providing surface data corresponding to the second optical surface of the optical lens to be manufactured;

fixedly positioning the first optical surface of the semi-finished lens in a machining device in a blocking position with respect to a machining reference system of the machining device;

measuring tridimensional coordinates of the reference element using a mechanical probe;

determining the position of the reference element of the semi-finished lens in the machining reference system while the first optical surface is in the blocking position based on the measured tridimensional coordinates of the reference element;

determining the position of the first optical surface in the machining reference system using the determined position of the reference element in the machining reference system; and manufacturing the second optical surface according to the surface data so that the second optical surface is orientated with respect to the determined position of the first optical surface in the machining reference system.

2. The method for manufacturing an optical lens according to claim 1, further comprising providing the position of the second optical surface to be manufactured relative to the first optical surface in the first reference system.

3. The method for manufacturing an optical lens according to claim 1, further comprising determining the position of the reference element relative to the first optical surface.

4. A non-transitory computer readable medium on which is stored one or more sequences of instructions that are accessible to a processor and which, when executed by the processor, causes the processor to carry out the method of claim 1.

5. A machining device for manufacturing an optical lens, the machining device having a machining reference system, the machining device comprising:

a blocking system configured to fixedly position the first optical surface of a semi-finished lens in a machining device in a blocking position with respect to the machining reference system, the semi-finished lens comprising a first optical surface comprising a surface design associated with a first reference system, a second optical surface to be manufactured, the first and second optical surfaces being connected by an external periphery surface, and a reference element provided on one or more of (i) the second optical surface and (ii) the external periphery surface, the reference element being an engraving mark, a position of the reference element being defined with respect to the first reference system;

a position tool comprising a probe configured to measure tridimensional coordinates of the reference element and determine the position of the reference element of the semi-finished lens in the machining reference system while the first optical surface is in the blocking position;

a processor configured to determine the position of the first optical surface in the machining reference system using the measured tridimensional coordinates of the reference element in the machining reference system; and a machining tool configured to manufacture by machining the second optical surface according to surface data corresponding to the second optical surface of the optical lens to be manufactured so that the second optical surface is positioned with respect to the determined position of the first optical surface in the machining reference system.

6. The machining device according to claim 5, wherein the blocking system comprises a clamp configured to clamp the semi-finished lens in the blocking position, the clamp defining the machining reference system.

7. The machining device according to claim 5, wherein the position tool comprises a digital camera configured to acquire images of the reference element through the semi-finished lens in the blocking position, and wherein the processor is further configured to determine the position of the reference element in the machining reference system using the images acquired by the camera while the first optical surface is in the blocking position.

8. A method for manufacturing an optical lens, the method comprising:

providing a semi-finished lens including a first optical surface comprising a surface design associated with a first reference system, a second optical surface to be manufactured, the first and second optical surfaces being connected by an external periphery surface, and a reference element provided at least partly on the second optical surface to be manufactured, the reference element being an engraving mark, a position of the reference element being defined with respect to the first reference system; providing surface data corresponding to the second optical surface of the optical lens to be manufactured;

fixedly positioning the first optical surface of the semi-finished lens in a machining device in a blocking position with respect to a machining reference system of the machining device;

measuring tridimensional coordinates of the reference element using a mechanical probe;

determining the position of the reference element of the semi-finished lens in the machining reference system while the first optical surface is in the blocking position based on the measured tridimensional coordinates of the reference element;

determining the position of the first optical surface in the machining reference system using the determined position of the reference element in the machining reference system; and manufacturing the second optical surface according to the surface data so that the second optical surface is orientated with respect to the determined position of the first optical surface in the machining reference system.

9. A machining device for manufacturing an optical lens, the machining device having a machining reference system, the machining device comprising:

a blocking system configured to position fixedly the first optical surface of a semi-finished lens in a machining device in a blocking position with respect to the machining reference system, the semi-finished lens including a first optical surface comprising a surface design associated with a first reference system, a second optical surface to be manufactured, the first and second optical surfaces being connected by an external periphery surface, and a reference element provided at least partly on the second optical surface to be manufactured, the reference element being an engraving mark, a position of the reference element being defined with respect to the first reference system;

a position tool comprising a probe configured to measure tridimensional coordinates of the reference element and determine the position of the reference element of the semi-finished lens in the machining reference system while the first optical surface is in the blocking position;

a processor configured to determine the position of the first optical surface in the machining reference system using the measured tridimensional coordinates of the reference element in the machining reference system; and a machining tool configured to manufacture by machining the second optical surface according to surface data corresponding to the second optical surface of the optical lens to be manufactured so that the second optical surface is positioned with respect to the determined position of the first optical surface in the machining reference system.

* * * * *